(12) United States Patent
Weissman

(10) Patent No.: US 8,700,645 B2
(45) Date of Patent: Apr. 15, 2014

(54) ON-DEMAND DATABASE SERVICE SYSTEM, METHOD, AND COMPUTER PROGRAM PRODUCT FOR VALIDATING A DEVELOPED APPLICATION

(75) Inventor: Craig Weissman, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 1277 days.

(21) Appl. No.: 12/192,951

(22) Filed: Aug. 15, 2008

(65) Prior Publication Data

US 2009/0049065 A1 Feb. 19, 2009

Related U.S. Application Data

(60) Provisional application No. 60/956,629, filed on Aug. 17, 2007.

(51) Int. Cl.
*G06F 7/00* (2006.01)
*G06F 17/30* (2006.01)

(52) U.S. Cl.
USPC .......................................... 707/755; 707/802

(58) Field of Classification Search
CPC ..... G06F 17/30067; G06F 9/52; G06F 21/53; G06F 17/30188
USPC ................................................ 707/755, 802
See application file for complete search history.

(56) References Cited

U.S. PATENT DOCUMENTS

| | | | |
|---|---|---|---|
| 5,960,204 A * | 9/1999 | Yinger et al. | 717/176 |
| 6,347,398 B1 * | 2/2002 | Parthasarathy et al. | 717/178 |
| 6,529,784 B1 * | 3/2003 | Cantos et al. | 700/79 |
| 6,971,093 B1 | 11/2005 | Spring | |
| 6,981,250 B1 | 12/2005 | Wiltamuth et al. | |
| 7,124,101 B1 | 10/2006 | Mikurak | |
| 7,209,929 B2 | 4/2007 | Dominguez, Jr. et al. | |
| 7,698,160 B2 | 4/2010 | Beaven et al. | |
| 7,779,039 B2 | 8/2010 | Weissman et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,145,651 B2 | 3/2012 | Weissman | |
| 8,275,836 B2 | 9/2012 | Beaven et al. | |
| 8,418,139 B2 | 4/2013 | Dhanakshirur et al. | |
| 2003/0233404 A1 | 12/2003 | Hopkins | |
| 2004/0210866 A1 | 10/2004 | Friedman et al. | |
| 2004/0225952 A1 | 11/2004 | Brown et al. | |

(Continued)

FOREIGN PATENT DOCUMENTS

| | | |
|---|---|---|
| EP | 0498130 A2 | 8/1992 |
| WO | 2008045199 A2 | 4/2008 |

OTHER PUBLICATIONS

U.S. Appl. No. 60/828,192, filed Oct. 4, 2006.

(Continued)

*Primary Examiner* — Kuen Lu

(74) *Attorney, Agent, or Firm* — Zilka-Kotab, PC

(57) ABSTRACT

In accordance with embodiments, there are provided mechanisms and methods for validating a developed application. These mechanisms and methods for providing such validation can enable embodiments to ensure that new versions of developed applications will operate in the same application environment of a previous version. The ability of embodiments to provide such validation may lead to an improved application migration development/runtime framework, etc.

19 Claims, 8 Drawing Sheets

(56) References Cited

U.S. PATENT DOCUMENTS

| | | | |
|---|---|---|---|
| 2005/0027846 A1 | 2/2005 | Wolfe et al. |
| 2005/0065925 A1 | 3/2005 | Weissman et al. |
| 2005/0223022 A1 | 10/2005 | Weissman et al. |
| 2005/0283478 A1 | 12/2005 | Choi et al. |
| 2006/0206834 A1 | 9/2006 | Fisher et al. |
| 2008/0141240 A1 | 6/2008 | Uthe |
| 2009/0049102 A1 | 2/2009 | Weissman |
| 2009/0049288 A1 | 2/2009 | Weissman |
| 2012/0151444 A1 | 6/2012 | Weissman |

OTHER PUBLICATIONS

Non-Final Office Action from U.S. Appl. No. 12/192,956, dated Aug. 11, 2011.
Non-Final Office Action from U.S. Appl. No. 12/192,943, dated Aug. 2, 2011.
Non-Final Office Action from U.S. Appl. No. 12/192,948, dated Aug. 10, 2011.
International Search Report and Written Opinion from International Application No. PCT/US08/09760, dated Nov. 10, 2008.
Examination Report from European Patent Application No. 08 795 353.5, dated Sep. 2, 2011.
European Search Report from European Patent Application No. 08 795 353.5, dated Nov. 30, 2010.
salesfoce.com, "Creating Application with the AppExchange Platform," Feb. 12, 2006, retrieved from http://web.archive.org/web/20060212200116/blog.sforce.com/sforce/files/creating_apps_with_appexchange_.pdf on Oct. 26, 2010.
Final Office Action from U.S. Appl. No. 12/192,956, dated Nov. 30, 2011.
Notice of Allowance from U.S. Appl. No. 12/192,943, dated Nov. 16, 2011.
Final Office Action from U.S. Appl. No. 12/192,948, dated Nov. 16, 2011.
Habeeb, M., "Amazon SimpleDB," an excerpt from A Developer's Guide to Amazon SimpleDB, Aug. 2010, pp. 1-15, retrieved from http://thecloudtutorial.com/amazonsimpledb.html.
Summons to Attend Oral Proceedings from European Application No. 08795353.5, dated Jan. 28, 2013.
Office Action from Taiwan Application No. 097131379, dated Feb. 7, 2013.
Non-Final Office Action from U.S. Appl. No. 13/398,752, dated Mar. 22, 2013.
Final Office Action from U.S. Appl. No. 13/398,752, dated Jun. 25, 2013.
Notice of Allowance from Taiwan Application No. 097131379, dated Jul. 31, 2013.
Advisory Action from U.S. Appl. No. 13/398,752, dated Sep. 6, 2013.
Non-Final Office Action from U.S. Appl. No. 12/192,948, dated Dec. 11, 2013.
European Search Report from European Application No. 13176000.1, dated Sep. 16, 2013.
European Search Report from European Application No. 13175999.5, dated Oct. 9, 2013.
Notice of Allowance from U.S. Appl. No. 12/192,956, dated Dec. 26, 2013.
Notice of Allowance from U.S. Appl. No. 13/398,752, dated Jan. 10, 2014.

* cited by examiner

ON-DEMAND DATABASE SERVICE SYSTEM, METHOD, AND COMPUTER PROGRAM PRODUCT FOR VALIDATING A DEVELOPED APPLICATION

CLAIM OF PRIORITY

This application claims the benefit of U.S. Provisional Patent Application 60/956,629 entitled "SYSTEM, METHOD, AND COMPUTER PROGRAM PRODUCT FOR VERSION LATCHING IN AN ON DEMAND APPLICATION SERVICES PLATFORM," by Craig Weissman, filed Aug. 17, 2007, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to developer frameworks, and more particularly to developing applications in an improved manner.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

There is often a desire to develop various applications for extending capabilities of the aforementioned database systems. To date, however, such applications have typically been developed in a manner independent of an intended application environment in which the developed application will operate. As a result, there is an increased chance that the developed application will not operate properly in such environment. This, in turn, may lead to various shortcomings in application migration, etc.

BRIEF SUMMARY

In accordance with embodiments, there are provided mechanisms and methods for validating a developed application. These mechanisms and methods for providing such validation can enable embodiments to ensure that new versions of developed applications will operate in the same application environment of a previous version. The ability of embodiments to provide such validation may lead to an improved application migration development/runtime framework, etc.

In an embodiment and by way of example, a method is provided for validating a developed application. In use, a developed application is received at an on-demand database service. Additionally, the developed application is validated. Still yet, the developed application is conditionally distributed based on the validation. By this framework, it may be validated that the developed application and at least one other application will properly operate together such that the developed application may be distributed based on the determination.

While the present invention is described with reference to an embodiment for validating a developed application for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

General Overview

Systems and methods are provided for verifying that a developed application associated with an on-demand database service will operate properly with at least one other application.

In the development of applications for use with database systems, many challenges exist resulting from the fact that applications have typically been developed in a manner independent of an intended application environment in which the developed application will operate. As a result, there is an increased chance that the developed application will not operate properly in such environment. Thus, mechanisms and methods provided herein for verifying adequate operation can enable embodiments to ensure that new versions of developed applications will operate in the same application environment of a previous version. The ability of embodiments to make such determination may lead to an improved application migration development/runtime framework, etc.

Next, mechanisms and methods will be described for verifying that a developed application associated with an on-demand database service will operate properly with at least one other application, in accordance with various exemplary embodiments.

Figure 1:
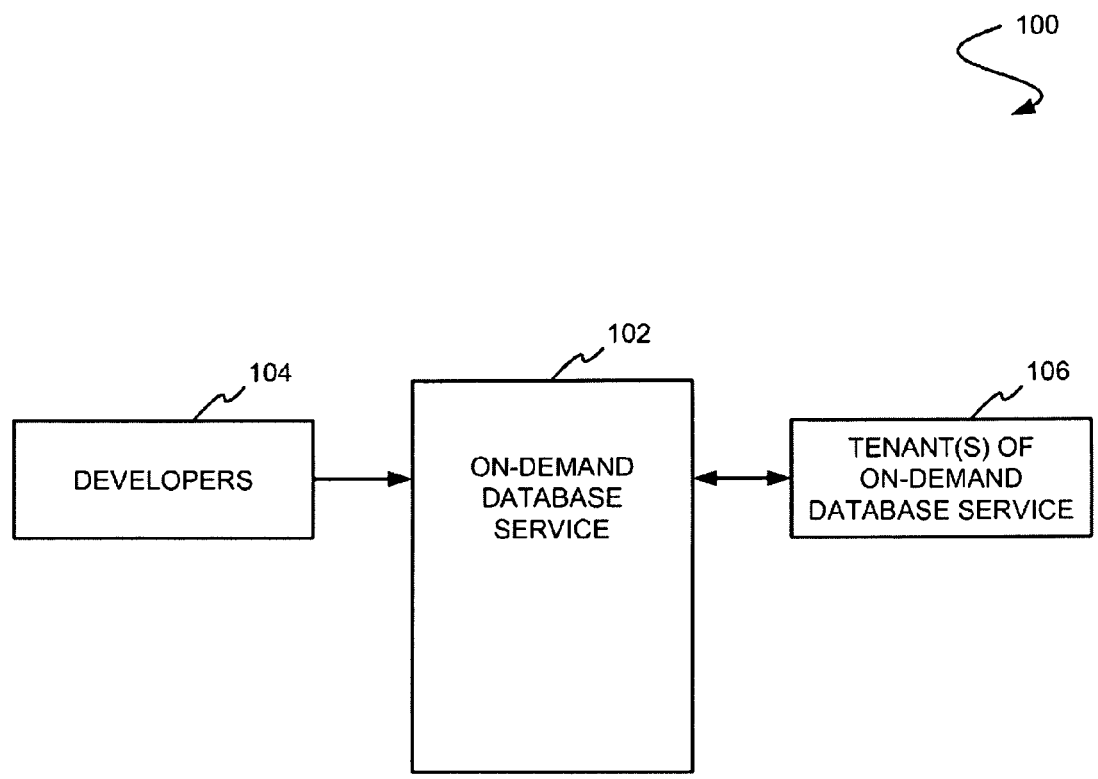
FIG. 1 illustrates a system for verifying that a developed application associated with an on-demand database service will operate properly with at least one other application, in accordance with one embodiment.

FIG. 1 illustrates a system 100 for verifying that a developed application associated with an on-demand database service 102 will operate properly with at least one other application, in accordance with one embodiment. In the context of the present description, an on-demand database service may include any service that relies on a database system that is accessible over a network.

In one embodiment, the on-demand database service 102 may include a multi-tenant on-demand database service. In the present description, such multi-tenant on-demand database service may include any service that relies on a database system that is accessible over a network, in which various elements of hardware and software of the database system may be shared by one or more customers. For instance, a given application server may simultaneously process requests for a great number of customers, and a given database table may store rows for a potentially much greater number of customers.

As shown, the on-demand database service 102 communicates with a plurality of developers 104. In use, the on-demand database service 102 is adapted to receive developed applications from the developers 104. In the context of the present description, the developers 104 may include any one or more persons or entities (e.g. corporation, organization, etc.) that develop computer code. Further, the applications may include any computer code (e.g. a complete program, a partial program, a code segment, etc.).

In addition, the on-demand database service 102 communicates with one or more tenants 106 of the on-demand database service 102. In the aforementioned embodiment where the on-demand database service 102 includes a multi-tenant on-demand database service, a plurality of the tenants 106 may exist. In any case, a tenant refers to any one or more persons or entities that are capable of accessing the on-demand database service 102, in the present description. For example, the tenant(s) 106 may subscribe to the on-demand database service 102.

By this design, the on-demand database service 102 serves to provide access to the applications to the tenant(s) 106 of the on-demand database service 102. In use, the aforementioned applications may be under the control of the on-demand database service 102. By administering such control, an improved development/runtime framework, etc. is thereby provided.

In various embodiments, such control may be administered in any desired manner. For example, the on-demand database service 102 may enforce any desired policies by precluding access to applications by the tenant(s) 106, in situations where the applications do not adhere to the policies. In other embodiments, the on-demand database service 102 may enforce such policies by precluding or limiting functionality accessible to the developers 104, in such non-compliant scenario. For example, publication of an application to the on-demand database service 102 may be disallowed in the absence of meeting certain requirements. In one specific embodiment, the on-demand database service 102 may monitor and limit various aspects of the applications and terminate related code, based on a dynamic contextual limiter. Of course, the foregoing control may be implemented in any desired manner.

In one embodiment, the aforementioned control may take the form of limiting at least one aspect of the applications by the on-demand database service 102. For instance, such aspect may relate to processing, storage, bandwidth, etc. resources made available to the applications of the developers 104. By this design, the on-demand database service 102 may be able constrain the developers in a way that optimizes the ability of the on-demand database service 102 to service the tenant(s) 106 via the applications.

In various embodiments, such resources-related aspect may involve a database associated with the on-demand database service 102, a manner in which such database may be accessed utilizing the applications, etc. In such embodiments, the foregoing aspect may include, but is not limited to a number of columns of a database, a number of queries to a database in a predetermined timeframe, a number of rows returned by queries, a number of database statements (e.g. modification statements, etc.), a number of script statements between database statements, a number of rows processed (e.g. modified, etc.) in a predetermined timeframe, a number of transaction statements, a total number of uncommitted rows since a last transaction control statement, a total number of script statements since a last database call, a duration of processing, etc.

Of course, such exemplary list is not to be construed as limiting. For example, any aspect of the on-demand database service 102 (e.g. electronic mail management, etc.) may also be limited as well. In one specific instance, a number of e-mails one can send per request and/or a number of outbound web service calls made per request, may be limited. In various embodiments, limits may be applied to an application on a per-request basis or on a per-time-period (e.g. per day) basis. In the latter embodiment, such limitation may apply on a per-user or per-tenant basis.

In other embodiments, a development of the applications may be controlled. For example, the applications may be controlled by imposing requirements of the on-demand database service 102 that the applications be tested (e.g. validated, etc.). Such testing may, in one embodiment, be natively run in an automated manner, by way of a call made to an application program interface associated with the on-demand database service 102.

In other aspects of the present embodiment involving development controls, the on-demand database service 102 may require that functional tests be written for applications and further require a predetermined percentage of code coverage. In this embodiment, such technique may allow one to run such tests whenever the on-demand database service 102 is modified, to reduce the risk of accidentally breaking working applications. By this design, regression and/or any other negative traits may be avoided.

In still additional embodiments, access to the applications by the tenant(s) 106 of the on-demand database service 102 may be controlled. For instance, a single instance of each application may be instantiated among a plurality of the tenant(s) 106 of the on-demand database service 102. Thus, only a single copy of the application need be stored by the on-demand database service 102, and simultaneously shared amongst the tenant(s) 106 in the foregoing manner.

In yet another embodiment, the on-demand database service 102 may be utilized to determine whether a developed application associated with the on-demand database service 102 will operate properly with another application. In this case, the developed application may be received from one of the developers 104 at an on-demand database service 102. A data structure may then be provided which describes aspects of the developed application. Information associated with at least one other application of one or more of the subscribers or tenants 106, with which the developed application is to operate, is identified. By this framework, it may be determined whether the developed application and the at least one other application will properly operate together, utilizing the data structure and the information.

In various embodiments, the on-demand database service 102 may be implemented to ensure adequate operation of a first application associated with the on-demand database service 102 and a second application, or a different version of the first application. For example, in one embodiment, a developed application may be received at an on-demand database service 102 and it may be determined whether at least one test is provided. In this case, the test may include a test for testing whether a first application operates properly with a second application. The developed application may then be conditionally validated based on the determination.

In another embodiment, a developed application may be received at the on-demand database service 102 and the developed application may be validated. The developed application may then be conditionally distributed based on the validation.

In still another embodiment, program instructions of an application may be received at the on-demand database service 102. A version of the program instructions to be invoked may then be determined. Furthermore, an appropriate portion of the program instructions may be invoked based on the determined version.

It should be that the forgoing control may be static or dynamic, may or may not be uniformly applied, etc. For example, the foregoing aspects and related control criteria may or may not be different for different applications, tenants 106, etc. Just by way of example, the on-demand database service 102 may allow for more resources when running an upgrade script, with respect to when running a per-row database trigger, etc. Further, the on-demand database service 102 may allow for more resources for large tenants 106, etc.

Figure 2:
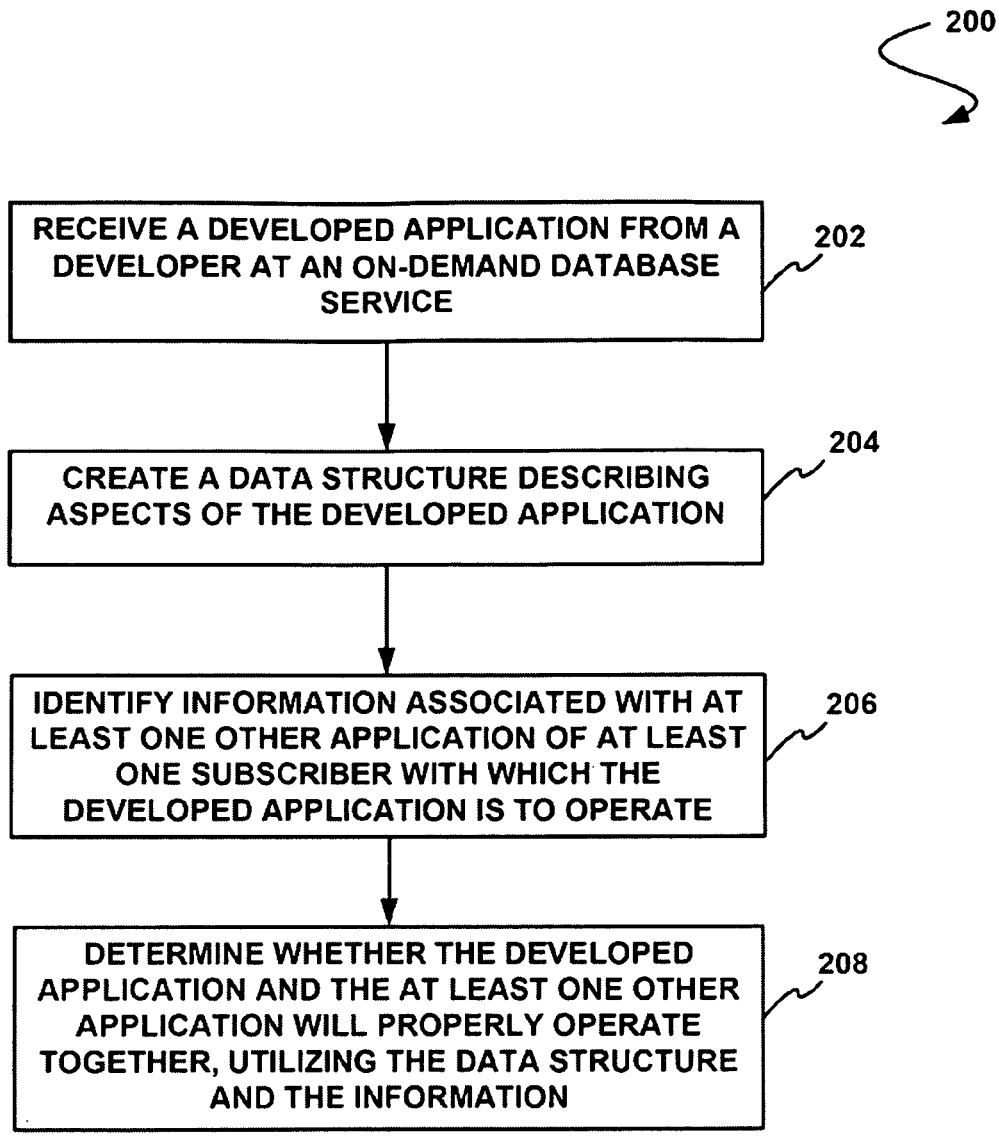
FIG. 2 shows a method for determining whether a developed application associated with an on-demand database service will operate properly with at least one other application, in accordance with one embodiment.

FIG. 2 shows a method 200 for determining whether a developed application associated with an on-demand database service will operate properly with at least one other application, in accordance with one embodiment. As an option, the present method 200 may be implemented in the context of the on-demand database service 102 of FIG. 1. Of course, however, the method 200 may be carried out in any desired environment. The aforementioned definitions may apply during the present description.

As shown, a developed application is received from a developer at an on-demand database service. See operation 202. A data structure describing aspects of the developed application is then created. See operation 204.

The aspects described by the data structure may include any number of aspects. For example, in various embodiments, the aspects may include a version identifier, a schema, a message shape, a semantic behavior, uniform resource locators, etc.

Additionally, information associated with at least one other application of at least one subscriber with which the developed application is to operate is identified. See operation 206. Further, it is determined whether the developed application and the at least one other application will properly operate together, utilizing the data structure and the information. See operation 208.

As an option, the at least one subscriber and the developer may be allowed to edit at least one component of the developed application. For example, if it is determined that the developed application and the at least one other application will not properly operate together, at least one of the developer and the subscriber may be allowed to edit the developed application. In this case, the at least one component may include a field. For example, the field may be a field associated with the developed application or the at least one other application that will not allow the applications to properly operate together.

In one embodiment, a plurality of versions of the developed application may be tracked to determine which versions a plurality of the subscribers are utilizing. In this case, the tracking may be performed to ensure that subscribers are migrating towards the use of the developed application.

In another embodiment, information may be received by an on demand application services platform. In this case, such information may include program code comprising an application capable of being run by the platform. Further, the application may be associated with at least one indication of a version. In addition, the information may be stored as inetadata in association with the version, enabling changes to the application to be tracked using the version.

Thus, the platform may store applications as metadata on behalf of a user organization. As an option, all development by an organization may be accomplished in separate development organizations, which may begin by representing metadata copies of the organization.

Additionally, all of the configuration changes made by an organization (e.g. organization permission, black tab settings, and all metadata, etc.) may be captured in a portable metadata file format and may be stored in a source code control system, such that a development organization for that customer may be created from first principles using only metadata application programming interfaces (APIs).

As an option, multiple developers may each have their own development organization. In one embodiment, multiple developers may share in-process changes with one another using metadata APIs based on XML-representations of those changes and a project manifest (e.g. a file that may point at all the top-level entities/files in that project). Inside the development organization, that project may be represented as an unmanaged package, which may be used to keep track of what objects are needed by that project. The file system manifest may be kept up to date with this database project, such that all developers might see the same work items for a project.

As an option, a metadata spider may maintain the database project as changes are made that may require several objects to be added to the manifest. For example, one presentation by the metadata spider may be "Here are the other things I think you need to add now, which would you like to include?" Once the changes are developed and tested, those changes may then be applied to the production organization using a deployment API.

In one embodiment, production organizations may integrate with standard functionality provided by the on-demand service provider as well as managed installed exchange applications. These customizations may bind to an exact major version number for those applications (e.g. the settings may represent metadata that the organization controls) and developers may have the ability to choose when to upgrade to new major versions of those applications.

As an option, customizations may be implemented by an organization to a managed package (e.g. to the subscriber controlled fields). In this case, a developer row may be partitioned from the subscriber row, either in the data structure explicitly, or in the file format. For example, there may be an explicit "overlay" file format for subscriber customizations and the changes may be included as part of the manifest file.

To produce a new development organization (e.g. a new workspace) for an existing application, a developer may signup for a new organization, and may specify an application namespace, password, and a version from which the developer is branching. This may install all necessary applications (e.g. dependent managed applications) and may place the application namespace into a development mode, which may make its components editable. Multiple developers working on the same application, or a version of that application, may communicate and share in-progress changes, by using source code control and metadata APIs, for example.

In one embodiment, a portion of the application definition may include the dependencies on other managed applications and/or on features, permissions, and editions. The testing environment provided by the platform may allow testing the application in all allowed configurations, which may include target organization edition settings. This may involve creating throw-away test organizations with those editions, installing all the code, and/or running the code. Further, the testing code may be allowed to emulate the different editions or settings in-place in the developer organization temporarily, without committing any of those changes.

As an option, for a new major version of an application, all components capable of being referenced may be flagged with a minimum version stamp with this new version. In one embodiment, the reference-able components may include schema (e.g. objects and fields, etc.) and/or Apex code identifiers. Also, if the application developer wishes to end-of-life certain elements (e.g. deprecate the components, etc.), this information may be included as part of the version metadata. For example, the last released version may become the max version for that component.

Once development and testing are finished for a version, one of those development organizations may be used to upload the new version. A new version number may then be created. For example, a branched dot release version number may be created when there are branches. A new version row may also be created in an application version global table. The presence of this row may now invalidate the previous version of the development organization, since that version may represent a non-current version of the application.

In one embodiment, version numbering may be implemented using a standard notion of major and minor releases as well as branching. As an option, focused versioning may be implemented such that versions are numeric and monotonically increasing along each branch line. In another embodiment, a three level number schema may be implemented for the versioning, where major releases such as 1.0.0 and 2.0.0 may be for introducing big functionality, new schema, and/or for changing the public signature of Apex code and schema objects (e.g. adding and dropping, etc.).

In this case, sub-major releases may be branches. These may allow adding new functionality to one major release while developing another major release. Additionally, sub-major versions may allow merging to another major version. For example, sub-major version numbers may include 2.1, 2.2, 3.1, etc.

In this way, the first two numbers of the fully qualified version may determine the public signature of the application version in use. Thus, the term "version" may refer to major and sub-major version numbers (e.g. an x.y portion of the version number).

In one embodiment, every externally addressable component of an application may receive a minimum version number, which may correspond to the version in which it was added. The application developer may also end-of-life (e.g. deprecate, etc.) a component by indicting that the component no longer appears in the version currently under development. This may mean that the component has a max version which is equal to the base version from which the current work is being developed. For these reasons, higher versions of an application may no longer be a super-set of lower-numbered versions. Thus, all dependencies may bind to an exact version number.

In the context of the present description, externally addressable components may include schema components (e.g. custom objects, custom fields, etc.), Apex Identifiers (e.g. types, variables, methods, etc.), and all other top-level metadata components that may be referenced (e.g. profiles may refer to layouts, workflow rules may refer to workflow actions, etc.). Accordingly, custom objects and fields may be given a max version, which may allow for deprecation. The same may be true for Apex Identifiers.

In one embodiment, all managed applications that interact with other managed applications may specify the exact version on which they depend. As an option, this may be exported as part of the metadata for an application version. Similarly, the code within an organization may specify exactly what version of an application is in use and/or is depended upon.

In this case, an organization version bundle may be utilized. An organization version bundle may include a set of application version numbers. As an option, each organization may have at least one version bundle, where a default bundle corresponds to all customizations in that organization and/or versions of the installed applications that were assumed when Apex Code or other customizations were authored.

In one embodiment, application developers may write their most recent code to be backwards compatible for old versions. This may be accomplished by exposing (e.g. in Apex Code) new runtime access to the version number of the current request. Application developers may be able to switch on this information to emulate old behavior.

In some cases, application developers may be responsible for enforcing rules such that semantics do not change for old versions. To facilitate this, test code may be ran as a old versions of that application, such that a developer may assert and/or test that old behaviors still work, even if the newest version of that application may behave differently.

In one embodiment, the metadata APIs may refer to top-level metadata objects by name. This may increase ability of a user to edit those files. Names may either be internal to the organization or application, or they may be references to names in other managed applications. References within an organization/application version may all be changed at once.

Between applications, the base application developer may be able to rename identifiers or deprecate the identifiers. In this way, the metadata for an application may include the old names of identifiers as far back as version information is needed for versions that may still be supported. Because extension developers may always bind to exact versions of other applications, the names may be immutable for all time, even if a new version of that application is pushed forward into the subscribing organization.

When an application version is installed, a symbol table may be materialized in the subscriber organization that may represent a mapping of a version bundle, entity type, and/or entity name to the ID of that row in the organization. All compile and/or metadata API operations may use this symbol table for name resolution.

By using latched version bundles (e.g. which may assert the image of an application in use by the organization), installing a new version of an application into an organization may not change the view of that application for the subscribing organization. Furthermore, if an organization is ready to use functionality in the new version of an application, that subscribing organization may change its current version bundle to point at the new version before any of those changes, in signatures or functionality, are observed. As an option, this may first be done in a test environment.

In addition, the minimum installed version of an application in an organization may be tracked, since there may be several different version bundles in the organization specifying different version numbers. Thus, any elements whose max version is less than the minimum version in use in the subscribing organization may be withheld from install.

In one embodiment, the minor version number, mentioned above, may be used for changing (e.g. fixing) items such as Apex code, Apex pages, documents, etc. As an option, these changes may be pushed to all subscribing organizations. As another option, minor versions may not change the public signature of any processes or schema objects. Thus, any version replacement may be transparent to the subscribing organization.

In one embodiment, only the most current minor version of an application may be installed. New minor versions may be pushed to all subscriber organizations within a short window. For example, new minor versions may be pushed via a reliable, restart-able background process.

It should be noted that the metadata for a new major version may also be pushed into all organizations without changing the behavior of that application for the subscribing organizations, as long as that application was written properly for backwards compatibility. Thus, the version installed in an organization may be different from the version in use by the organization. The latest code may be installed without changing the semantics.

In this way, a partner customer may change the internal operation of their application as long as the public semantics remain the same. For this reason, upgrades may be pushed to the head major version of any branch that a subscriber organization may be using. However, in general, the partner may not force subscribers to change their semantic usage of the old version.

On the other hand, communication between a partner and their subscribers may be encouraged. An organization for a partner application may allow the partner to observe who has installed that application and/or what versions are currently in use (e.g. via the version bundles, or minimum version, etc.).

In most cases, the partner may not remove any elements that are in use by a version that is still being used in some subscriber organization. However, once a custom field is no longer visible to any subscribing organization, it may be removed. This may occur a long time after deprecation. As an option, the partner may be able to indicate the minimum version of an application that may be installed by new organizations.

Figure 3:
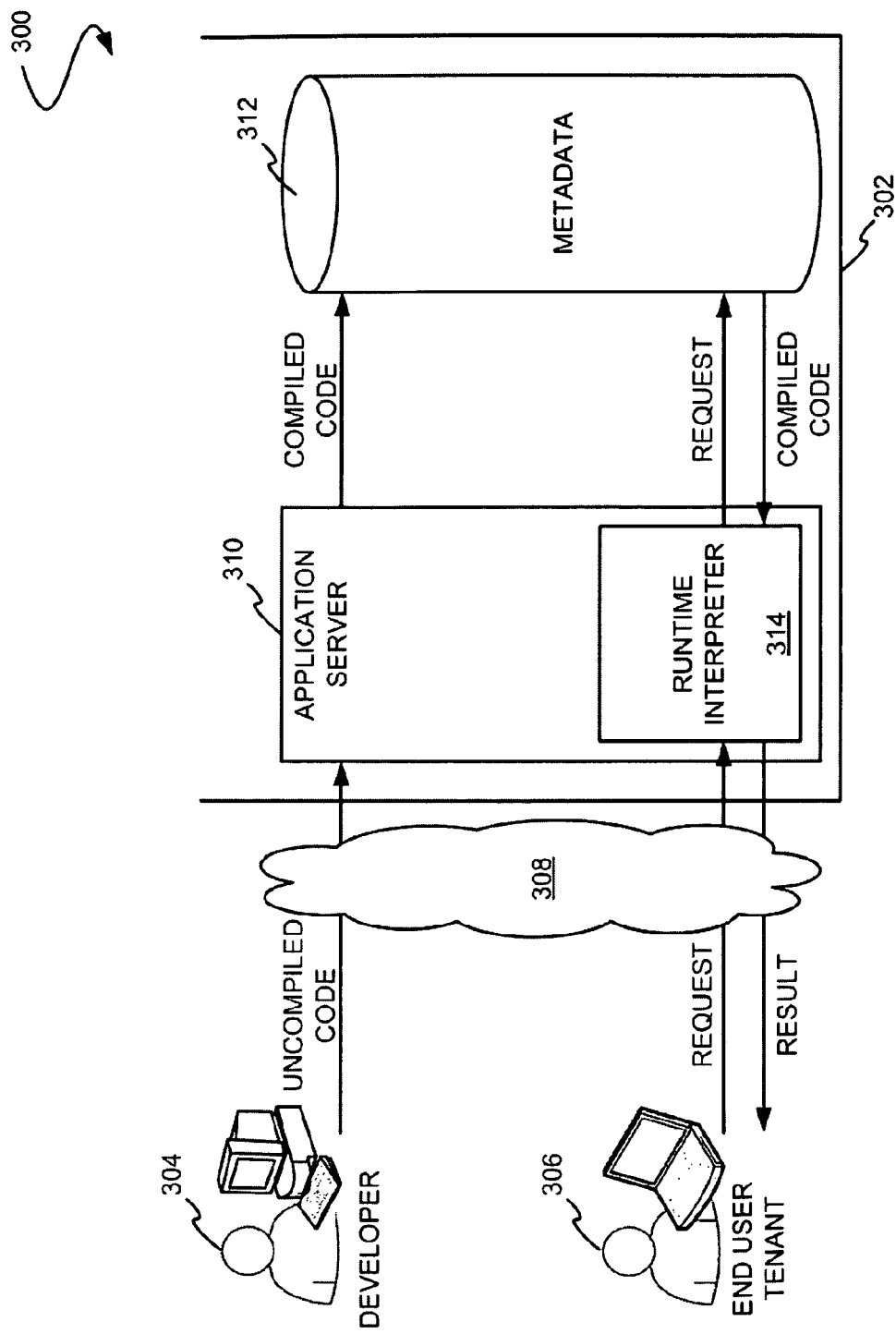
FIG. 3 shows a system for verifying that a developed application associated with an on-demand database service will operate properly with at least one other application, in accordance with another embodiment.

FIG. 3 shows a system 300 for verifying that a developed application associated with an on-demand database service 302 will operate properly with at least one other application, in accordance with another embodiment. As an option, the present system 300 may be implemented in the context of the architecture and functionality of FIGS. 1-2. Of course, however, the system 300 may be carried out in any desired environment. Again, the aforementioned definitions may apply during the present description.

As shown, the on-demand database service 302 remains in communication with a developer 304 and at least one end user tenant 306 via a network 308. Further, the on-demand database service 302 includes an application server 310 that interfaces with the developer 304 and user tenant 306 differently. Specifically, the application server 310 may interface with the developer 304 during a compile-time phase, and the user tenant 306 during a runtime phase.

For example, the application server 310 is adapted to receive program language instructions (e.g. script, etc.) from the developer 304 who may, in one embodiment, intend to extend an API of the on-demand database service 302. In response to receiving such script, the application server 310 processes (e.g. compiles, etc.) and stores the same in a database 312. As an option, such processing may further include any of the desired controls and/or updates mentioned earlier, to make sure that the developer 304 employs best practices, or any other predetermined practices in script development. In one embodiment, such compiled script may be stored in the form of metadata, for use in response to requests from the end user tenant 306. By this feature, the script may be adapted to be triggered in response to a particular associated request (e.g. request to select, access, modify, etc. an object) from the end user tenant 306.

Specifically, the application server 310 is further adapted for receiving requests from the end user tenant 306. In response to such requests, they are processed utilizing a run-time interpreter 314 of the application server 310, by using such request to identify and retrieve the correlating compiled script from the database 312. The run-time interpreter 314 is further equipped with the ability to processing the compiled script. The compiled script thus may dictate the manner in which the request is fulfilled, etc.

Figure 4:
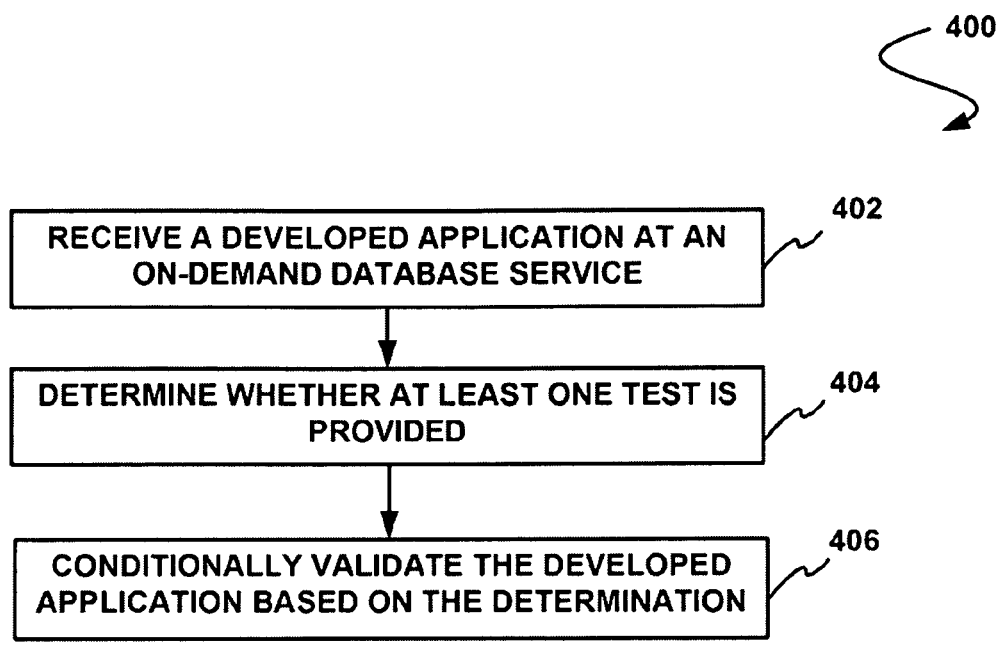
FIG. 4 shows a method for enforcing the inclusion of tests in a developed application, in accordance with one embodiment.

FIG. 4 shows a method 400 for enforcing the inclusion of tests in a developed application, in accordance with one embodiment. As an option, the present method 400 may be implemented in the context of the functionality and architecture of FIGS. 1-3. Of course, however, the method 400 may be carried out in any desired environment. The aforementioned definitions may apply during the present description.

As shown, a developed application is received at an on-demand database service. See operation 402. Further, it is determined whether at least one test is provided. See operation 404.

In one embodiment, the test may be provided by a developer of the developed application. As an option, the test may be provided with the developed application. Once it is determined whether a test is provided, the developed application is conditionally validated based on the determination. See operation 406.

In one embodiment, it may be determined whether the at least one test meets predetermined criteria. As an option, the predetermined criteria may include a test result. For example, the test may be executed utilizing known parameters and it may be determined whether the execution results in an acceptable predetermined result. In some cases, the predetermined result may include a standard deviation such that the result of the execution may be within a range of values.

In another embodiment, the predetermined criteria may include a threshold. In this case, the test may be executed and it may be determined whether a result of the execution is within a threshold. In still another embodiment, the test may be executed and it may be determined whether the execution resulted in an error.

In yet another embodiment, it may be determined whether the at least one test adequately tests whether the developed application is capable of executing a predetermined version thereof. For example, the developed application may include new or updated computer code, variables, variable names, methods, lists, and/or various other objects. In this case, the test may test whether the developed application is capable of executing at least a portion of an older version of the application, which may be included in the developed application.

As an option, the developed application may be conditionally validated based on at least one of the determinations, such as whether the test meets predetermined criteria and/or whether the at least one test adequately tests whether the developed application is capable of executing a predetermined version.

In one embodiment, the at least one test may test whether the developed application is capable of invoking different portions of program instructions based on a determined version. For example, the determined version may include an older or more recent version of the developed application. In this case, the program instructions may include any instructions or code associated with the developed application.

In some cases, the at least one test may test whether the application is capable of operation such that a first portion of the program instructions is invoked if, during runtime, it is determined that a first version of the program instructions is to be invoked, and a second portion of the program instructions is invoked if, during runtime, it is determined that a second version of the program instructions is to be invoked.

In this case, the first version of the program instructions and the second version of the program instructions may both be included with the application. The first and second version may be an older and a more recent version where at least one aspect of the versions is different. For example, the first version of the program instructions and the second version of the program instructions may differ with respect to at least one method, at least one class, or at least one variable.

As an option, it may be determined whether the at least one test is included with the developed application. In one embodiment, the validation of the developed application may be based on the determination. For example, it may be determined whether a test corresponding to a known change between a first and second version is included with the developed application. If the test is included, the test may be executed and the validation may be determined based on a result of the execution. If the test is not included, the developed application may not be validated.

In one embodiment, a developer may be forced to write a test that emulates a first version of at least a portion of an application, such that it may be determined that the first version of the at least a portion of the application functions adequately with a second version of the application. In this way, a test may be written in emulation mode such that it may be determined that an older version of an application functions adequately with a newer version of the application. Furthermore, it may be determined that the older version of the application functions adequately if the older version functions in a same or a similar manner to the functionality of the older version before the older version of the application was incorporated in a newer version of the application.

As an example, a developer may develop a first version of an application including the pseudo-code shown in Table 1.

TABLE 1 global integer m (string s) % % where m is any method {
   if (s == "a")
      return 1;
   else
      return 2; }

Subsequently, the developer may determine that an array of integers is to be returned and that the string "s" should not be compared to "a," but rather "x." Accordingly, the developer may create a second version of the application that includes the pseudo-code shown in Table 2.

TABLE 2 c deprecated global integer m (string s) {
   return m(s)[0];
}
global integer [ ] m(string s) {
   if (system.client_version < 2) {
     if(s == "a")
       return new_integer[ ] {1}; }
   return new_integer[ ] {5,6}; }

In this way, it may be determined, at runtime, which version of the application is being utilized. Based on this determination, code or variables associated with an old version may be utilized if it is determined an older version is being used, and code or variables associated with a new version may utilized if it is determined a new version is being used (e.g. in this case {5, 6}, etc.).

Additionally, a test may be included in the application to determine whether behavior associated with an older version of the application functions adequately or correctly in an updated version of the application. For example, Table 3 shows pseudocode for a test that may be included in the application to test whether the first version of the application operates adequately when implanted in the second updated version, in accordance with the example above.

TABLE 3 clstest (version = 1) test
system assert vals (1, m ('a'));
system assert vals (2, m ('x'));

Thus, at least a portion of an application may be tested, as if it were the first version, and it may be determined whether the values used in the test function the same in the second version of the application. In this way, a test may emulate a particular client and/or at least a portion of an application. Furthermore, runtime code may test what version should be utilized, and the correct code may be utilized. In one embodiment, the testing method described in the context of FIG. 4 may be implemented such that users of an on-demand database service may build on a platform provided by the on-demand database service.

Figure 5:
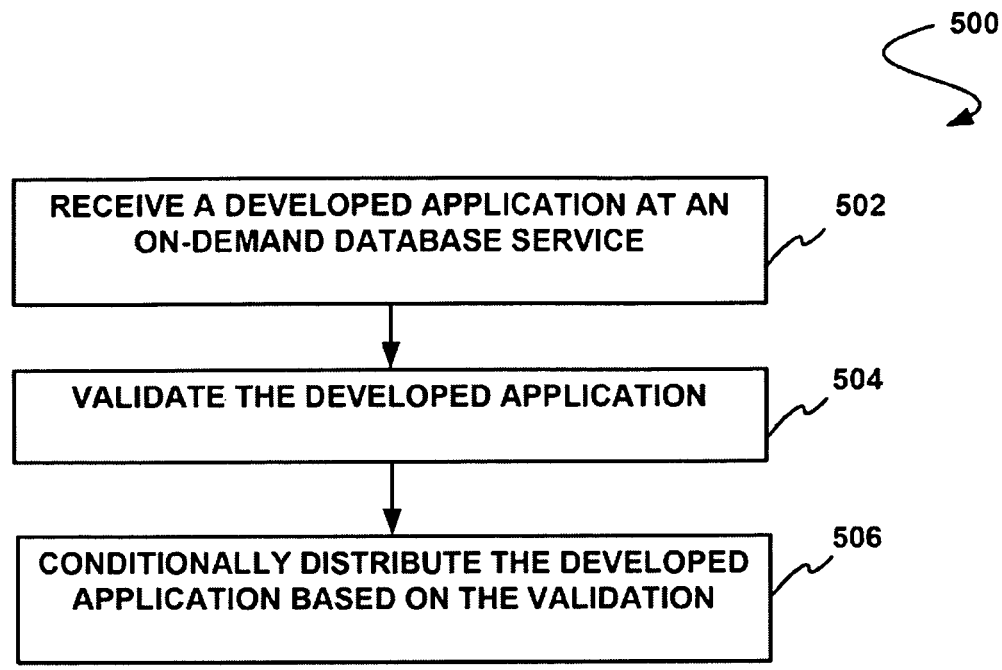
FIG. 5 shows a method for validating a developed application, in accordance with one embodiment.

FIG. 5 shows a method 500 for validating a developed application, in accordance with one embodiment. As an option, the present method 500 may be implemented in the context of the functionality and architecture of FIGS. 1-4. Of course, however, the method 500 may be carried out in any desired environment. Again, the aforementioned definitions may apply during the present description.

As shown, a developed application is received at an on-demand database service. See operation 502. Additionally, the developed application is validated. See operation 504. Still yet, the developed application is conditionally distributed based on the validation. See operation 506.

In one embodiment, the developed application may not be distributed if the developed application is not validated. On the other hand, the developed application may be distributed if the developed application is validated. In these cases, the validation may include implementing various techniques to validate the developed application.

In one embodiment, the validation may validate whether the developed application is capable of executing a predetermined version thereof. For example, a first older version of the application may be incorporated in a second more recent version of the application. In this case, the validation may include validating whether the second version of the application is capable of adequately operating functionality associated with the first version.

In another embodiment, the validation may validate whether the developed application is capable of invoking different portions of program instructions based on a determined version. For example, the validation may validate whether the application is capable of operation such that a first portion of the program instructions is invoked if, during runtime, it is determined that a first version of the program instructions is to be invoked, and a second portion of the program instructions is invoked if, during runtime, it is determined that a second version of the program instructions is to be invoked. In this case, the first version of the program instructions and die version of the program instructions may both be included with the developed application.

Furthermore, the first version of the program instructions and the second version of the program instructions may differ with respect to at least one method, at least one class, or at least one variable. As an option, a developer may be prevented from changing the developed application in a manner that would cause a loss of functionality of a previous version of the developed application. For example, a developer system may explicitly prevent the developer from removing or otherwise making changes that would break a pre-existing version of the application. Additionally, a developer may be prevented from modifying or deleting portions of a developed application that would cause any problems in a subscriber organization (e.g. with an older version of the application, etc.) if that new version were pushed to the subscriber.

In still another embodiment, the validation may include running at least one test on the developed application. As noted above, the at least one test may be included with the developed application. Additionally, it may be determined whether the at least one test runs as of a previous version of the developed application.

For example, a syntax for annotating that a test should run "as of" an older version may be included in the test and/or the developed application. Furthermore, a runtime mechanism may be included for testing what version a subscriber thinks the subscriber is running within the actual code. In this case, the developed application may include at least one test for determining, in run-time, a version of the developed application a subscriber of the on-demand database service is running, from the point of view of the subscriber.

In one embodiment, all lines of real code that address different versions may be required to be covered by the test code for validation. Thus, even if an application has a relatively high test coverage, these version-specific lines must be 100% covered. In this way, the validation may include determining whether a predetermined level of computer code coverage is present in the developed application. The developed application may then be validated if the predetermined level of computer code coverage is present in the developed application. If the predetermined level of computer code is not present, uploading of the application may be prevented.

The developed application may be distributed utilizing a variety of techniques. For example, the developed application may be distributed utilizing push technology. In the one embodiment, the developed application may be asynchronously distributed utilizing push technology. In still another embodiment, the developed application may be downloaded. As an option, only updated portions of the developed application may be distributed.

Figure 6:
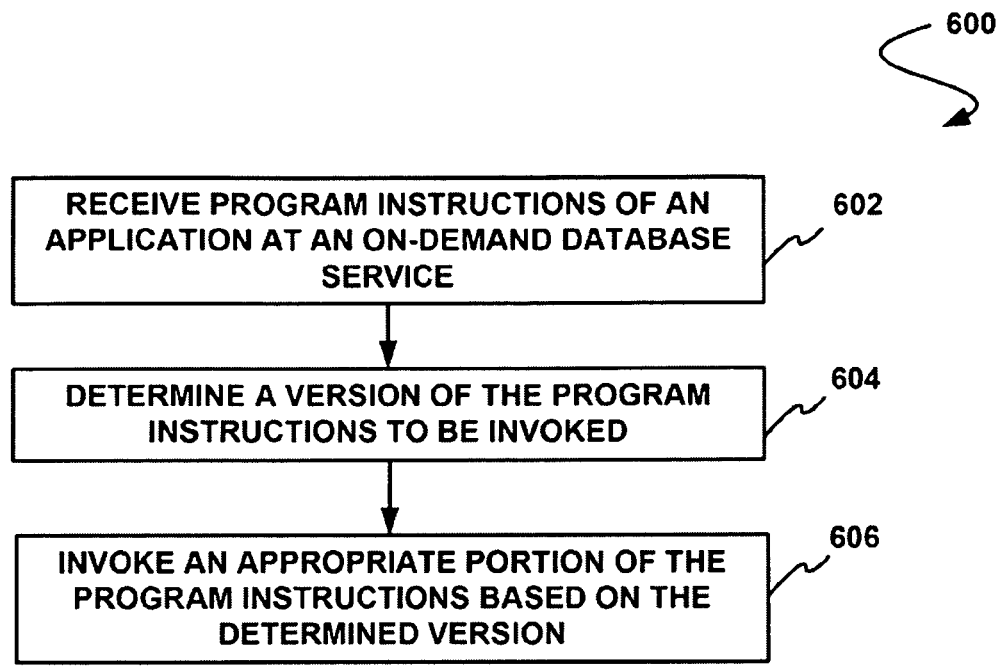
FIG. 6 shows a method for runtime invocation of an appropriate version of program instructions in an on-demand database service, in accordance with one embodiment.

FIG. 6 shows a method 600 for runtime invocation of an appropriate version of program instructions in an on-demand database service, in accordance with one embodiment. As an option, the present method 600 may be implemented in the context of the functionality and architecture of FIGS. 1-5. Of course, however, the method 600 may be carried out in any desired environment. The aforementioned definitions may apply during the present description.

As shown, program instructions of an application are received at an on-demand database service. See operations 602. Additionally, a version of the program instructions to be invoked is determined. See operation 604. Furthermore, an appropriate portion of the program instructions is invoked based on the determined version. See operation 606.

In one embodiment, the version may be determined utilizing version information associated with a subscriber of the on-demand database service. For example, a subscriber may be utilizing a first version of the program instructions which correspond to an older version of the program instructions. On the other hand, a second updated version of the program instructions associated with the developed application may be available.

In this case, the application may be pushed to a plurality of subscribers (e.g. asynchronously, etc.). At least one of the subscribers may be relying on functionality associated with the first version and may determine that the first version should continue to be used. Thus, the appropriate portion of the program instructions may be invoked based on this determination.

In one embodiment, a test included with the program instructions may be applied to the version information to identify the appropriate portion of the program instructions to be invoked. In this case, the test may include determining which version of program instructions are to be utilized based on the version information. The version information may include a version number, a version date, a last modified date, and/or various other version information.

In one embodiment, a first portion of the program instructions may be invoked if it is determined that a first version of the program instructions is to be invoked, and a second portion of the program instructions may be invoked if it is determined that a second version of the program instructions is to be invoked. In this case, the first version of the program instructions and the second version of the program instructions may both be included with the application.

Furthermore, the first version of the program instructions and the version of the program instructions may differ with respect to at least one method, at least one class, and/or at least one variable. For example, the first version of the program instructions may be a previous version and the second portion of the program instructions may be a later version. In this case, the first version of the program instructions may be marked in accordance with a predetermined format. For instance, the program instructions may be marked in a manner indicating a version (e.g. utilizing a version number, etc.), a subclass of a version (e.g. utilizing an extension of a version number, etc.), or other marking techniques.

Using these techniques, a push upgrade of a developed application may be allowed such that software components may be formally version released in a manner that a developer may evolve the upgrade package so existing installations are not disrupted. Furthermore, subscribers of an on-demand database service may be allowed to switch to later updated versions of applications in a predictable, testable manner.

Versioning may be implemented to formalize the extension and reference concept between software applications. Traditionally, most components of an application could be referenced in a manner defined by the subscriber. However, by utilizing private components, an on-demand database service may prevent such references. Versioning and deprecation allows the restriction of references to global components.

This may be accomplished using various techniques, as noted above. For example, components (e.g. classes, variables, methods, etc.) included in an application may export a minimum and a maximum version of the application in which they reside. Additionally, all references to a component may be made in a particular version bundle context which is an extension of an application version. Further, a version bundle may specify an application version of the on-demand database service provider as well as a single version for each application (i.e. a namespace, etc.) that may be referenced from that context.

Still yet, all references to components may be implemented within a particular bundle context. In this way, extension components may store a specific version bundle ID and may operate at runtime with that version bundle, which may be different from the initiating version bundle of the request. In one embodiment, all entry points (e.g. API calls, etc.) may include a version bundle context.

Using version information associated with the components (e.g. the version ID, etc.), a developer may end-of-life a component by deleting the component. In this case, the component may appear in a project list with an associated undelete link.

In the case of some class identifiers (e.g. Apex class identifiers, etc.) and some VF attributes, etc., the developer may indicate that an identifier is removed by using an indicator (e.g. a tag, a token, a flag, etc.), such as an "@deprecated" annotation. In this case, the @deprecated token may only be allowed for identifiers that have already been managed released. If the identifiers have not been managed released, an error may result. In these cases, once an identifier is uploaded in the @deprecated state, the identifier must retain the @deprecated annotation. Losing the @deprecated annotation may result in a new error.

When deprecating a type, all identifiers within that type may also be implicitly deprecated (e.g. inner or outer types). In one embodiment, the child identifiers may not be deprecated in this manner. For example, if the child identifiers are configured such that they are unable to be viewed when the surrounding parent identifier is unable to be viewed, the child identifiers may not be deprecated.

In one embodiment, a functional prototype for an Apex class (e.g. in a subscriber organization) may show version information. In this case, the version information may include a minimum and/or maximum version for a global identifier. Also, subscribers of the on-demand database service, such as development organizations, may be allowed to view the prototype via a link.

As an option, a table may be utilized to track version information. In this case, the table may be stored or maintained by the on-demand database service and/or the subscriber. In these cases, when an updated application or application package (e.g. a portion of an application, etc.) is uploaded, previous version information (e.g. a version ID, etc.) may be recorded in a column or row indicating a maximum version (e.g. a "max_all_package_version_id" column, etc.). This global state may be utilized to indicate that a component no longer exists in package versions starting with the version that last uploaded.

As an option, an application or an application package may include a user interface (UI) that shows version information to subscribers (e.g. developers, etc.), including information for child identifiers (e.g. Apex class identifiers, etc.), and layouts, etc. As another option, a class prototype in a subscriber organization may also show this information.

In one embodiment, new components that are uploaded and introduced in an updated application version may be available in the subscribing organizations as of that version, for versioning purposes. In this case, a first upload may determine the minimum version. In general, a component may not be deprecated/removed in an updated version. Thus, that designation will not have an affect on subscribers.

An application may export or upload the version bundles that the application needs to operate. A version bundle may include any named/namespaced component in an organization/application. In one embodiment, the version bundle may only include private components. In this case, private components refer to components that may not be referenced by other applications in other namespaces.

In one embodiment, a version bundle may specify the versions of other applications. For example, a header row may specify the version of the application of the on-demand database service. As an option, a child table (e.g. a "VersionBundleDefinition" table, etc.) that specifies which version ID is being used (e.g. a "AllPackageVersionId" tag, etc.) for each package ID (e.g. an "AllPackageId" tag, etc.) may be utilized.

It should be noted that version bundles and their definitions may be cached. In one embodiment, an organization information cache key or other cache key may be utilized to facilitate such caching.

In one embodiment, when a new application is installed, a developer may not have to add that application to existing version bundles. In this case, the installed version number may be inserted automatically. In this way, the version bundles may include a plurality of installed applications, specifying a version for each. As an option, when an application is uninstalled, the application may be removed from existing version bundles automatically.

In another embodiment, all organizations may have at least one version bundle. As an option, an organization may have one default version bundle. This default bundle may be created when the organization signs up using the current application of the on-demand database service. In this way, organizations will not see new schema in the application of the on-demand database service without changing the default or other version bundles.

In some cases, an organization may clone or edit an existing bundle. In one embodiment, editing an existing bundle may not be allowed to occur live in production. For example, the editing may be restricted where the editing adversely impacts (e.g. breaks, etc.) existing components (e.g. Apex code, etc.).

In one embodiment, a developer and/or an administrator may be presented with a tool or interface indicating which components are using each bundle. As an option, this tool may include a bundle detail screen. In another embodiment, developers and administrators may be prevented from editing and/or warned when trying to edit an existing bundle in such a way that would break existing components that use the bundle.

Further, version bundles may allow each component within an application to specify the particular needs of that component. These needs (e.g. functional information, etc.) may be different for different components as the application evolves. In one embodiment, this may be accomplished by storing the functional information, etc. in a foreign key column (e.g. a "VersionBundleId" column, etc.) in each component table. In this way, all managed components may have a "VersionBundleId" foreign key.

In the context of upgrades, an indicator indicating the version number (e.g. an "InstalledPackageVersion" tag, etc.) may be interpreted as the physical version number of installed applications. Because version bundles ensure that all uses of an installed application are "latched" to a particular version, the push upgrade process may modify this number without affecting the semantics of any components.

Additionally, the physically installed version may specify the maximum version that may be chosen in a version bundle. A minimum version tag or indicator may indicate the minimum non-deprecated version of that application. As another option, a subscriber may be prohibited from using a logical version before using the version the customer has installed.

Still yet, a time delay for use may be implemented such that a version bundle may be unable to use a newly installed physical version of an application or application portion for a predetermined time. In this way, if a problem is discovered, an older version may be "rolled back" before use of the problem program. In this case, a metadata install may support the physical rollback.

As noted above, API calls may specify their full versioning information, not just the API version information. In various embodiments, this may be accomplished by specifying version bundle information on the fly in the request (e.g. in a header, etc.), or by utilizing version bundle specific end points.

In some cases, developers associated with subscribers of the on-demand database service may wish to emulate application code behavior (e.g. Apex behavior, etc.) for an older version of their application. Thus, runtime access may be provided to the currently executing version information (e.g. information associated with "AllPackageVersion," etc.) for at least that application. This may be provided as a method in the application, for example. Additionally, to test this code, tests may be implemented (e.g. Apex tests) and may have the ability to specify that a test segment runs as of a specific version.

In one embodiment, a version provider interface may be utilized to provide version information. In this case, the interface may be implemented to retrieve and set version information. Furthermore, this interface may be utilized to determine the visibility of installed components and associated version information. The interface may also determine the backward capability of components utilizing the minimum/maximum version numbers, the namespace, and other information associated with components.

In order to maintain functionality of applications used by subscribers, information relating to a class hierarchy that was uploaded may be recorded in such a way that a developer is prevented from removing or changing component relationships in a mainer that may damage functionality of the subscribing organizations. For example, a global table (e.g. a "core.all_managed_class_rel" [AMCR] table, etc.) may be used to record the managed relationships among classes and interfaces. In this case, the table may include a plurality of fields including a global Apex class type identifier (e.g. "AMPM_id") that has a relationship (e.g. extends or implements, etc.) to another global type, a parent enumeration or ID (e.g. a user-defined type or a built-in system type constant, etc.), a package ID, and various other fields.

At upload time of a managed released package, all new class relationships may be recorded. In this case, only immediate relationships may be stored in the global table. In other words, not all implied transitive relationships may be stored in the table. When a class is later saved, it may be validated that no existing relationship in the table is removed. In the case of interface implementation, the redundant grandparent relationship may be left in the class signature.

In one embodiment, extension classes may remain constant. For example, once a global class extends another global class, that exact relationship may remain. Similarly, in the case that a class is released without any global super-class, a super-class may not be added at a later time. Furthermore, a "gender" of a type may not have the ability to be changed after upload. For example, a class may not be changed to an enumeration or interface.

With respect to pushing updates, adding a new global method may call for versioning. The presence of a new global method in a base class could cause issues in an extension class if the extension happens to use that same signature. However, in the context of Apex versioning, the subscriber may add an override keyword to the method when the subscriber upgrades to the latest version in the version bundle.

In one embodiment, no new global final methods may be added in a later application version. In this case, all final methods may be virtual. For example, if a subscriber had used a method signature, the subscriber may not be able to migrate a class onto the newest version of the base class since the final designation may prevent this.

As an option, new global types may be added because the subclass may have a type with the same name. In this case, references to the base type may need to be fully qualified in order to be used. Additionally, a new global variable may be allowed to be added because the subscriber may have a variable with the same name. For static variables, the exact variable may be referenced using the fully qualified class name. For member variables, the subclass variable may always be reached, even if it is shadowed, by assigning the super-type object to a variable declared of the subtype.

In one embodiment, no new abstract or interface methods may be added in a global class update. For example, the base class might try to call new abstract or interface method assuming that all subclasses or implementers provide an implementation for those methods. However, subscribers using an earlier version of the application may not have implemented those methods yet. If there is no way to prevent invocation of those methods from the base class point of view, the addition of new abstract methods may be prevented (e.g. either at this class level or any class below it in the hierarchy), as well as the addition of interfaces that have the same effect.

Furthermore, global abstract classes may be prevented from including any public abstract methods. This may be implemented because there may be no way for the extending application to access the methods the application is configured to execute.

Additionally, a virtual keyword may not be taken away from a managed method. For example, once released as virtual, the keyword should stay virtual. As an option, a final method may be permitted to become virtual. Still yet, a concrete class may only be permitted to become abstract if it had no global constructors before.

Using these techniques, a development ecosystem may be provided that manages component lifecycles and enforces signature invariance that separates a physically installed version from a logical version in use by subscribers of an on-demand database service. This ensures compatibility for a push upgrade, which is an automated managed upgrade process in the ecosystem that ensures no visible changes until the subscriber is ready. Furthermore, a coding language may be utilized that has signature versioning and runtime inspection of client versions built in, allowing for automated testing of backwards compatibility.

System Overview

Figure 7:
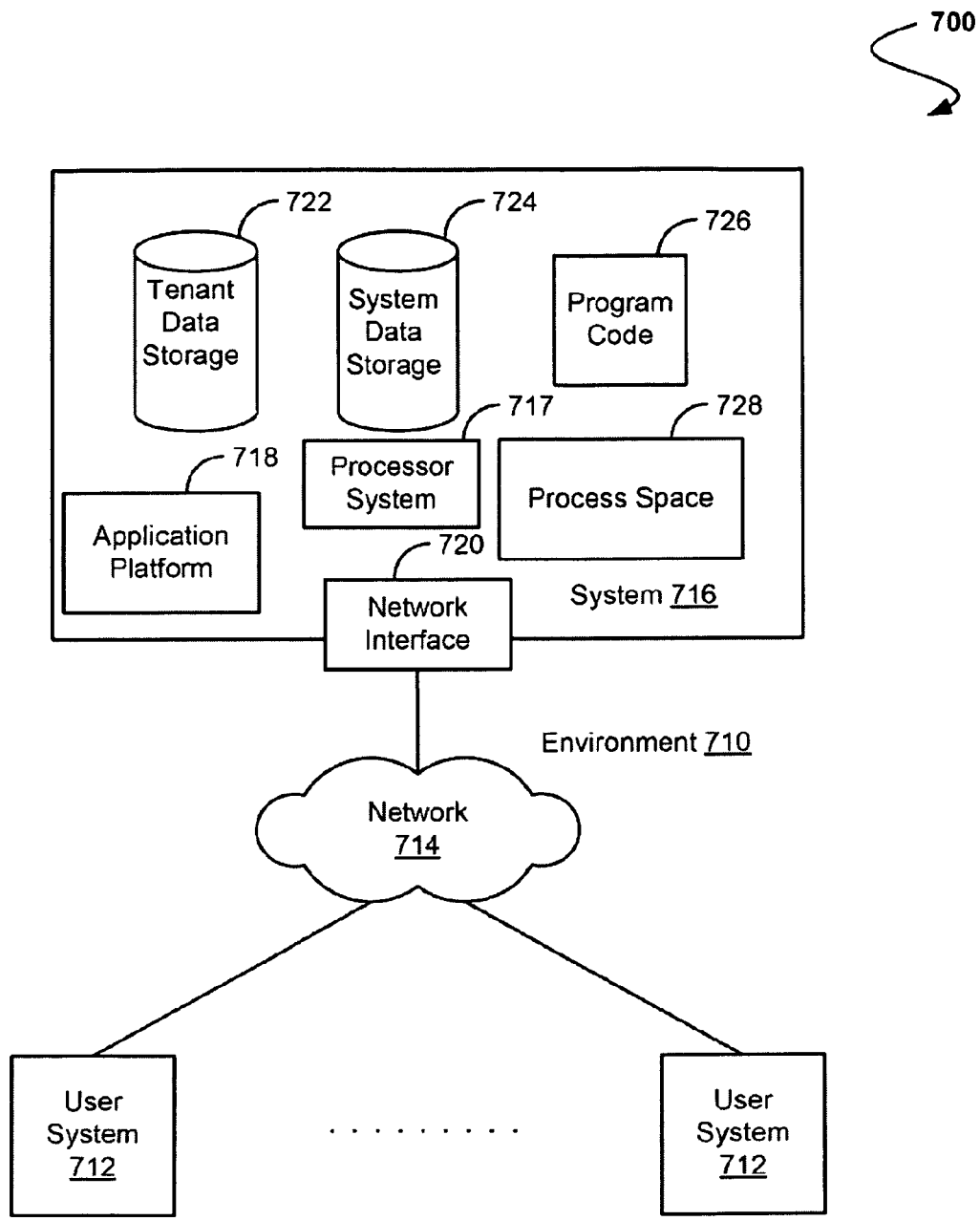
FIG. 7 illustrates a block diagram of an example of an environment wherein an on-demand database service might be used.

FIG. 7 illustrates a block diagram 700 of an environment 710 wherein an on-demand database service might be used. As an option, any of the previously described embodiments of the foregoing figures may or may not be implemented in the context of the environment 710. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7 (and in more detail in FIG. 8) user systems 712 might interact via a network with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

Figure 8:
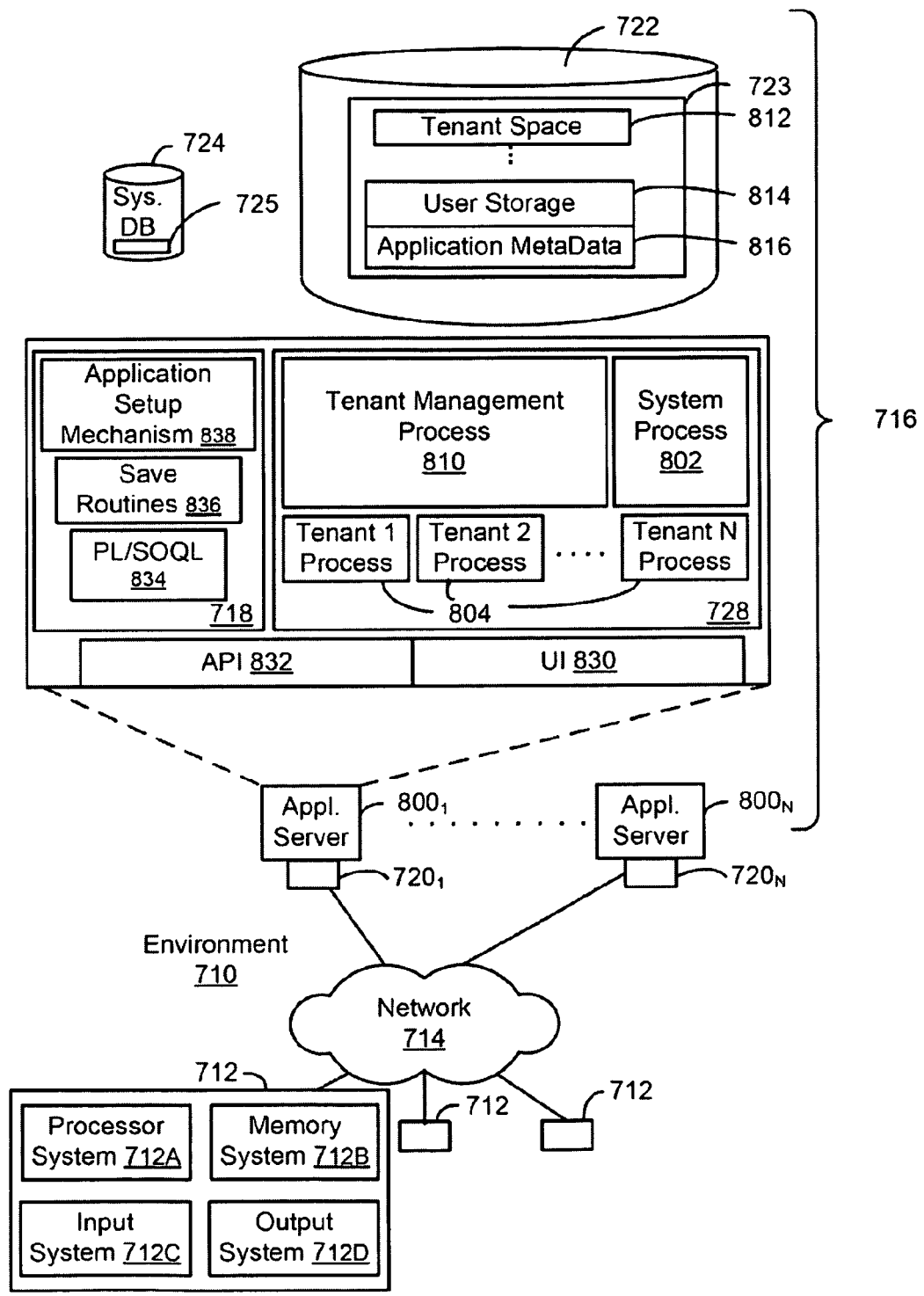
FIG. 8 illustrates a block diagram of an embodiment of elements of FIG. 7 and various possible interconnections between these elements.

One arrangement for elements of system 716 is shown in FIG. 8, including a network interface 720, application platform 718, tenant data storage 722 for tenant data 723, system data storage 724 for system data accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717 of FIG. 7, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 8 also illustrates environment 710. However, in FIG. 8 elements of system 716 and various interconnections in an embodiment are further illustrated. FIG. 8 shows that user system 712 may include processor system 712A, memory system 712B, input system 712C, and output system 712D. FIG. 8 shows network 714 and system 716. FIG. 8 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers $800_1$-$800_N$, system process space 802, tenant process spaces 804, tenant management process space 810, tenant storage area 812, user storage 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 8, system 716 may include a network interface 720 (of FIG. 7) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 7112. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. A detailed description of some PL/SOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server $800_1$ might be coupled via the network 714 (e.g., the Internet), another application server $800_{N-1}$ might be coupled via a direct network link, and another application server $800_N$ might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of die employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 800 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WEB SERVICES IN A MULTI-TENANT DATABASE SYSTEM," filed Jun. 16, 2004; and/or US2006/0206834, titled "SYSTEMS AND METHODS FOR IMPLEMENTING MULTI-APPLICATION TABS AND TAB SETS," filed Mar. 8, 2005; which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, comprising:
receiving at least one aspect of a developed application at an on-demand database service, the at least one aspect of the developed application received from a first user via a web browser on a first computer;
providing an indication to the first user, through the first user's web browser, that the at least one aspect of the developed application has been validated; and
receiving a request to utilize the at least one aspect of the developed application on behalf of a second user, the request received in response to the second user using a second aspect of the developed application;
wherein if the request is received prior to providing the first user with the indication that the at least one aspect of the developed application has been validated, the second user is precluded from using the at least one aspect of the developed application and the second user's request is denied.

2. The method of claim 1, wherein the developed application is not distributed if the at least one aspect of the developed application is not validated.

3. The method of claim 1, wherein the developed application is distributed if the at least one aspect of the developed application is validated.

4. The method of claim 1, wherein the developed application is distributed utilizing push technology.

5. The method of claim 1, wherein the developed application is asynchronously distributed utilizing push technology.

6. The method of claim 1, wherein the validation includes running at least one test on the at least one aspect of the developed application.

7. The method of claim 6, wherein the at least one test is included with the developed application.

8. The method of claim 6, further comprising determining whether the at least one test runs as of a previous version of the developed application.

9. The method of claim 1, wherein the on-demand database service includes a multi-tenant on-demand service.

10. The method of claim 1, wherein the validation includes determining whether a predetermined level of computer code coverage is present in the at least one aspect of the developed application.

11. The method of claim 10, wherein the at least one aspect of the developed application is validated if the predetermined level of computer code coverage is present in the developed application.

12. The method of claim 1, wherein the developed application includes at least one test for determining, in run-time, a version of the developed application a subscriber of the on-demand database service is running, from the point of view of the subscriber.

13. A non-transitory machine-readable medium carrying one or more sequences of instructions which, when executed by one or more processors, cause the one or more processors to carry out the steps of:
receiving at least one aspect of a developed application at an on-demand database service, the at least one aspect of the developed application received from a first user via a web browser on a first computer;
providing an indication to the first user, through the first user's web browser, that the at least one aspect of the developed application has been validated; and
receiving a request to utilize the at least one aspect of the developed application on behalf of a second user, the request received in response to the second user using a second aspect of the developed application;

wherein if the request is received prior to providing the first user with the indication that the at least one aspect of the developed application has been validated, the second user is precluded from using the at least one aspect of the developed application and the second user's request is denied.

14. An apparatus, comprising:
a computer processor; and
one or more stored sequences of instructions which, when executed by the computer processor, cause the computer processor to carry out the steps of:
receiving at least one aspect of a developed application at an on-demand database service, the at least one aspect of the developed application received from a first user via a web browser on a first computer;
providing an indication to the first user, through the first user's web browser, that the at least one aspect of the developed application has been validated; and
receiving a request to utilize the at least one aspect of the developed application on behalf of a second user, the request received in response to the second user using a second aspect of the developed application;
wherein if the request is received prior to providing the first user with the indication that the at least one aspect of the developed application has been validated, the second user is precluded from using the at least one aspect of the developed application and the second user's request is denied.

15. A method for transmitting code for use in a multi-tenant database system on a transmission medium, the method comprising:

transmitting code for receiving at least one aspect of a developed application at an on-demand database service, the at least one aspect of the developed application received from a first user via a web browser on a first computer;
transmitting code for providing an indication to the first user, through the first user's web browser, that the at least one aspect of the developed application has been validated; and
transmitting code for receiving a request to utilize the at least one aspect of the developed application on behalf of a second user, the request received in response to the second user using a second aspect of the developed application;
wherein if the request is received prior to providing the first user with the indication that the at least one aspect of the developed application has been validated, the second user is precluded from using the at least one aspect of the developed application and the second user's request is denied.

16. The method of claim 15, wherein the developed application is not distributed if the at least one aspect of the developed application is not validated.

17. The method of claim 15, wherein the developed application is distributed if the at least one aspect of the developed application is validated.

18. The method of claim 15, wherein the developed application is distributed utilizing push technology.

19. The method of claim 15, wherein the developed application is asynchronously distributed utilizing push technology.

* * * * *